(12) United States Patent
Sasaki et al.

(10) Patent No.: US 11,048,964 B2
(45) Date of Patent: Jun. 29, 2021

(54) SURVEY DATA PROCESSING DEVICE, SURVEY DATA PROCESSING METHOD, AND SURVEY DATA PROCESSING PROGRAM

(71) Applicant: TOPCON CORPORATION, Tokyo (JP)

(72) Inventors: Daisuke Sasaki, Tokyo (JP); George Kelly Cone, Austin, TX (US); Junki Kaneko, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 396 days.

(21) Appl. No.: 16/145,354

(22) Filed: Sep. 28, 2018

(65) Prior Publication Data
US 2020/0104627 A1    Apr. 2, 2020

(51) Int. Cl.
*G06K 9/62* (2006.01)
*G01S 7/48* (2006.01)
(Continued)

(52) U.S. Cl.
CPC .......... *G06K 9/6202* (2013.01); *G01S 7/4808* (2013.01); *G01S 17/06* (2013.01); *G06F 3/04845* (2013.01); *G06T 19/20* (2013.01)

(58) Field of Classification Search
CPC ..... G06K 9/6202; G01S 7/4808; G01S 17/06; G06F 3/04845; G06T 19/20
See application file for complete search history.

(56) References Cited

U.S. PATENT DOCUMENTS 9,671,217 B2    6/2017  Meltzer
2009/0241358 A1  10/2009  Ohtomo et al.
(Continued)

FOREIGN PATENT DOCUMENTS

EP    3489625 A1    5/2019
JP    2008-28004 A  11/2008
(Continued)

OTHER PUBLICATIONS

Che, Erzhuo, Jaehoon Jung, and Michael J. Olsen. "Object recognition, segmentation, and classification of mobile laser scanning point clouds: A state of the art review." Sensors 19.4 (2019): 810. (Year: 2019).*

(Continued)

*Primary Examiner* — Pinalben Patel
(74) *Attorney, Agent, or Firm* — Chiesa Shahinian & Giantomasi PC

(57) ABSTRACT

A survey data processing device includes a point cloud data receiving unit, a vertically cut section generating unit, and a vertical position adjusting unit. The point cloud data receiving unit receives first point cloud data and second point cloud data that are respectively obtained at a first instrument point and a second instrument point. The vertically cut section generating unit cuts the first point cloud data and the second point cloud data at a vertical plane containing the first instrument point and the second instrument point to obtain a vertically cut section of each of the first point cloud data and the second point cloud data. The vertical position adjusting unit matches vertical positions of the vertically cut sections of the first point cloud data and the second point cloud data as viewed from a direction perpendicular to the vertical plane.

3 Claims, 6 Drawing Sheets

(51) Int. Cl.
    *G01S 17/06* (2006.01)
    *G06F 3/0484* (2013.01)
    *G06T 19/20* (2011.01)

(56) References Cited

U.S. PATENT DOCUMENTS

| | | |
|---|---|---|
| 2010/0256940 A1 | 10/2010 | Ogawa et al. |
| 2012/0218546 A1 | 8/2012 | Ogawa et al. |
| 2013/0314688 A1 | 11/2013 | Likholyot |
| 2015/0042645 A1 | 2/2015 | Kawaguchi et al. |
| 2015/0331111 A1* | 11/2015 | Newman ............... G01S 17/58 356/4.01 |
| 2018/0052232 A1* | 2/2018 | Ohtomo ............... G01C 15/002 |
| 2018/0087901 A1 | 3/2018 | Komeichi et al. |
| 2019/0087073 A1* | 3/2019 | Ruby ................... G06F 3/04842 |
| 2019/0162853 A1 | 5/2019 | Kumagai et al. |
| 2019/0339850 A1* | 11/2019 | Ho ....................... A61B 5/0066 |

FOREIGN PATENT DOCUMENTS

| | | |
|---|---|---|
| JP | 2010-151682 A | 7/2010 |
| JP | 6184237 B2 | 8/2017 |

OTHER PUBLICATIONS

Japanese Patent Application Serial No. 2018-178656, filed Sep. 25, 2018, 52 pgs.
Extended European Search Report dated Feb. 24, 2020, in connection with European Patent Application No. 19194228.3, 8 pgs.

\* cited by examiner

SURVEY DATA PROCESSING DEVICE, SURVEY DATA PROCESSING METHOD, AND SURVEY DATA PROCESSING PROGRAM

BACKGROUND OF THE INVENTION

Technical Field

The present invention relates to a technique for processing information that is obtained by laser scanner.

Background Art

Laser scanners that perform laser scanning using laser light to obtain point cloud data are publicly known. Such laser scanners are disclosed in Japanese Patent No. 6,184,237 and U.S. Pat. No. 9,671,217, for example. The laser light for measurement does not reach areas hidden from the laser scanner, and thus, it is difficult to obtain point cloud data of such areas. This phenomenon is called "occlusion". To cope with this problem, laser scanning may be performed at two or more different instrument points to obtain two or more pieces of point cloud data, and these pieces of the point cloud data are merged to obtain point cloud data with little or no occlusion.

To merge the multiple pieces of the point cloud data, which are obtained at different instrument points, it is necessary to obtain correspondence relationships between the multiple pieces of the point cloud data. In a condition in which exterior orientation parameters (position and attitude) of the laser scanner at each of the instrument points are obtained, the multiple pieces of the point cloud data can be used in a common coordinate system, and the merging of the multiple pieces of the point cloud data is easy. However, this method requires an operation to obtain the exterior orientation parameters of the laser scanner at each of the instrument points and is therefore not convenient.

The multiple pieces of the point cloud data may be matched by template matching or other method, to determine the correspondence relationships. However, this method is performed by software processing, which can cause an increase in unnecessary calculations and low accuracy, unless a certain level of rough matching is performed in advance. For this reason, normally, corresponding points are selected by an operator, and then, precise matching is performed by software processing.

SUMMARY OF THE INVENTION

A method of manually selecting corresponding points between two pieces of point cloud data has low working efficiency in finding the corresponding points. Thus, a more convenient method is desired. In view of these circumstances, an object of the present invention is to provide a technique that enables easy determination of correspondence relationships between multiple pieces of point cloud data that are obtained at multiple instrument points by using a laser scanner.

An aspect of the present invention provides a survey data processing device including a point cloud data receiving unit, a vertically cutting unit, and a vertical position matching unit. The point cloud data receiving unit receives first point cloud data and second point cloud data. The first point cloud data is obtained by a first laser scanner that is placed so as to be horizontal at a first instrument point. The second point cloud data is obtained by a second laser scanner that is placed so as to be horizontal at a second instrument point. The vertically cutting unit cuts the first point cloud data and the second point cloud data at a vertical plane containing the first instrument point and the second instrument point to obtain a vertically cut section of each of the first point cloud data and the second point cloud data. The vertical position matching unit matches vertical positions of the vertically cut sections of the first point cloud data and the second point cloud data as viewed from a direction perpendicular to the vertical plane.

The survey data processing device of the present invention may further include a horizontally cutting unit, a horizontal position matching unit, and an instrument point position obtaining unit. The horizontally cutting unit cuts the first point cloud data and the second point cloud data at a horizontal plane to obtain a horizontally cut section of each of the first point cloud data and the second point cloud data. The horizontal position matching unit matches positions of the horizontally cut sections of the first point cloud data and the second point cloud data as viewed from a vertical direction. The instrument point position obtaining unit obtains positions of the first instrument point and the second instrument point of the first point cloud data and the second point cloud data as viewed downwardly from the vertical direction, on the basis of the first point cloud data and the second point cloud data of which the horizontal positions are matched by the horizontal position matching unit. The present invention can also be understood as an invention of a method and an invention of a program.

The present invention provides a technique that enables easy determination of correspondence relationships between multiple pieces of point cloud data that are obtained at multiple instrument points by using a laser scanner.

PREFERRED EMBODIMENTS OF THE INVENTION

Overview

Figure 1:
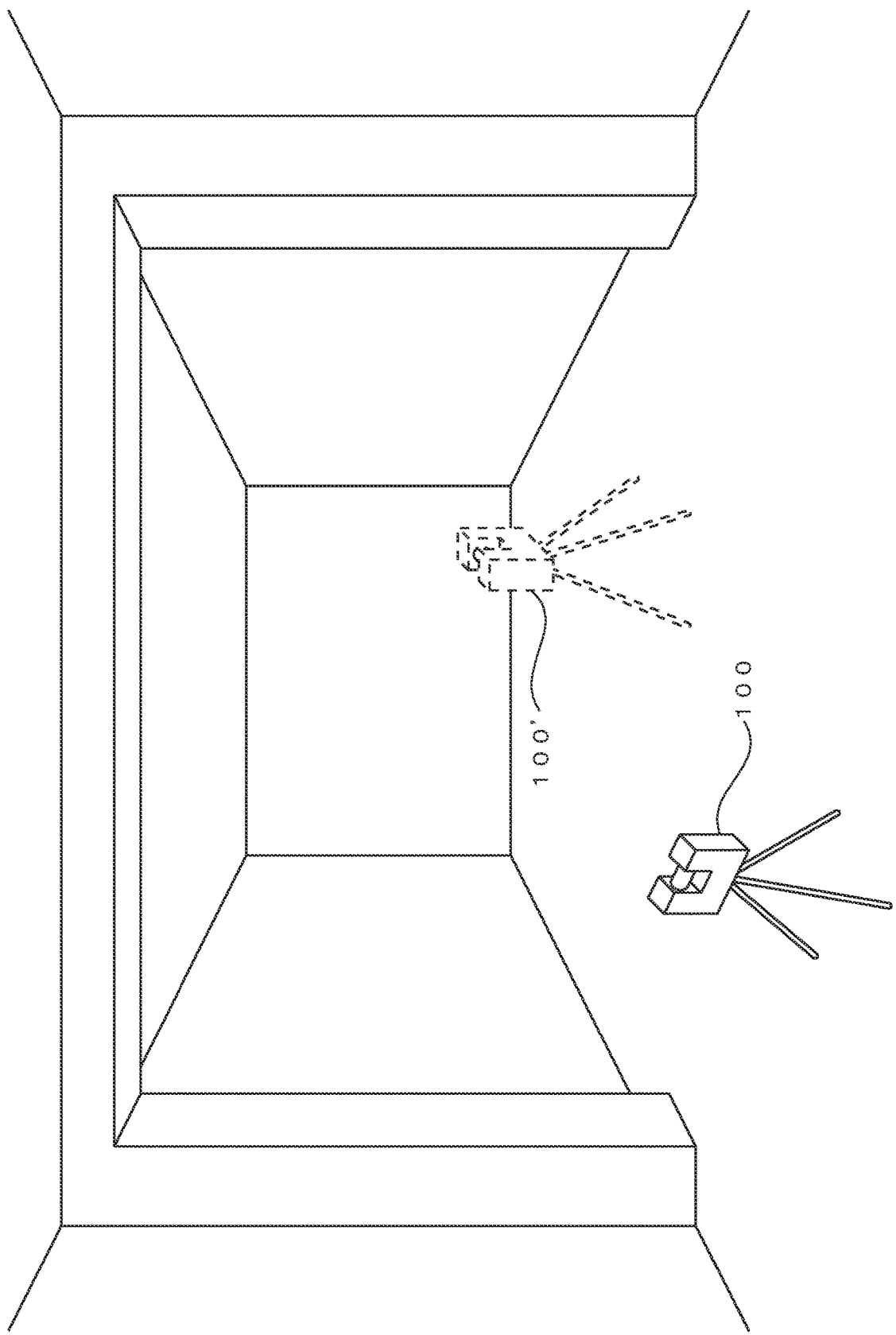
FIG. 1 shows a general view of an embodiment.

FIG. 1 shows a situation in which an interior of a room is laser scanned from two instrument points. For example, one laser scanner is used to perform a first laser scanning at a first instrument point and then is used to perform a second laser scanning at a second instrument point that is different from the first instrument point. FIG. 1 shows a laser scanner 100 that is placed at a first instrument point and also shows a laser scanner 100' that is placed at a second instrument point. In this case, the laser scanner 100 and the laser scanner 100' are the same. Of course, it is possible to use two laser scanners. In addition, three or more instrument points may be selected. The instrument point is a position of an optical origin of a laser scanner and serves as a point of view for laser scanning. Point cloud data is obtained by using the instrument point as the origin.

The point cloud data is obtained by emitting laser light sporadically to an object and by calculating three-dimensional coordinates of each reflection point on the basis of a principle of laser positioning. The point cloud data includes sets of points, for each of which a coordinate position is obtained in a three-dimensional coordinate system having the instrument point as the origin.

It is assumed that the laser scanners 100 and 100' are placed so as to be horizontal, and relationships of exterior orientation parameters (position and attitude) between the laser scanners 100 and 100' are not known at the time of laser scanning.

Laser Scanner

Figure 2:
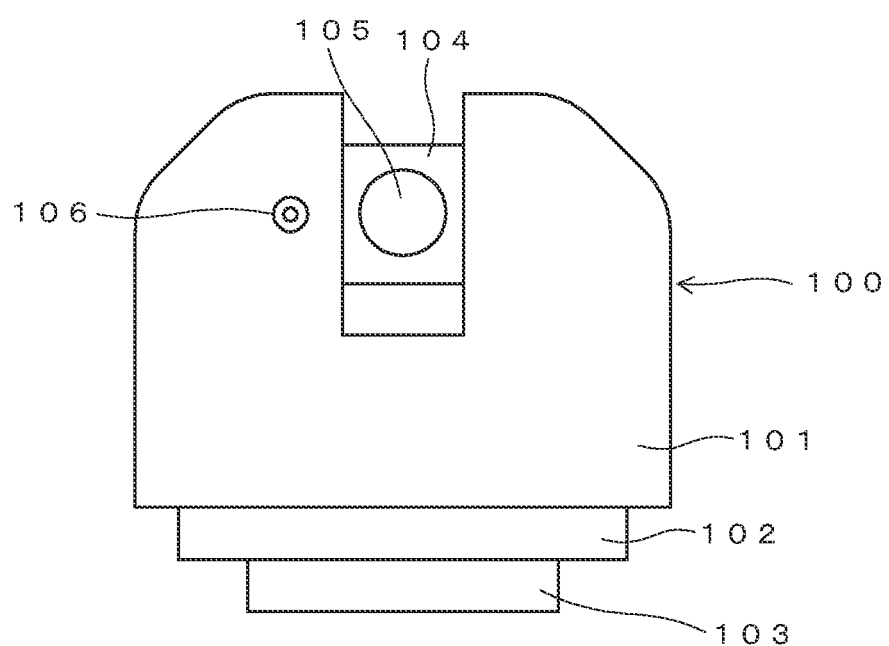
FIG. 2 is a front view of a laser scanner.

FIG. 2 shows the laser scanner 100. The laser scanner 100 obtains point cloud data. Details of the laser scanner are disclosed in Japanese Unexamined Patent Applications Laid-Open Nos. 2010-151682 and 2008-268004, for example.

The laser scanner 100 has a horizontally rotating unit 101 that serves as a body, a base 102 that supports the horizontally rotating unit 101 in a horizontally rotatable manner, and a table 103 on which the base 102 is mounted. The horizontally rotating unit 101 is horizontally rotatable relative to the base 102 by electric operation. The table 103 has an adjusting mechanism that adjusts a horizontal condition of the horizontally rotating unit 101. The horizontally rotating unit 101 has a level (not shown) that is mounted thereon for checking the horizontal condition. The table 103 may be fixed on a top of a tripod or another tool.

Figure 3:
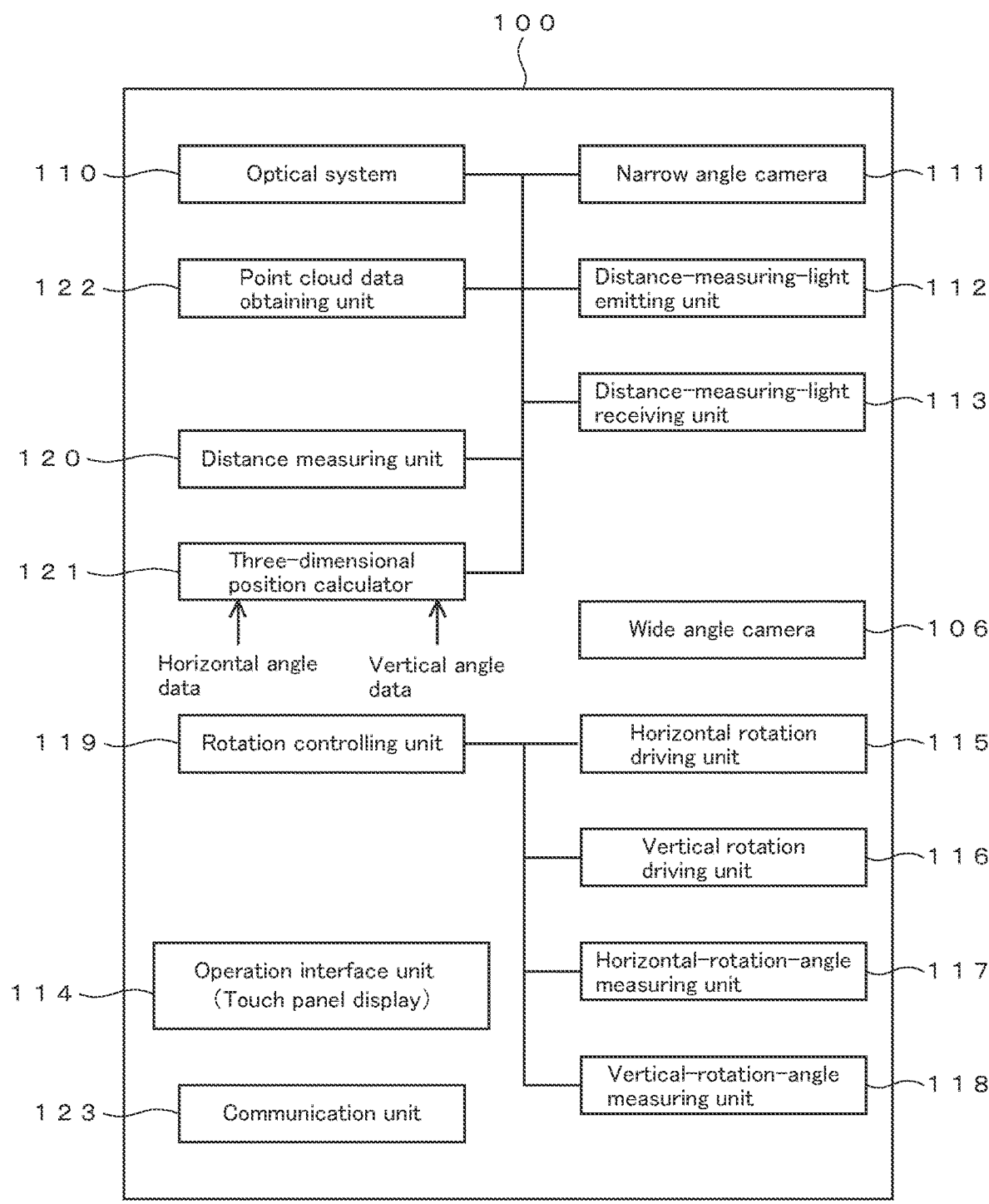
FIG. 3 is a block diagram of the laser scanner.

The horizontally rotating unit 101 has a double-headed body with an approximately U-shape and has a pair of extending parts that upwardly extend to form the approximate U-shape. The pair of the extending parts has a vertically rotating unit 104 that is disposed between the extending parts. The vertically rotating unit 104 vertically rotates around a horizontal axis by electric operation. The vertically rotating unit 104 includes an objective lens 105. The horizontally rotating unit 101 contains a narrow angle camera 111, which is shown in FIG. 3. The objective lens 105 is shared by distance measuring light for obtaining point cloud data and the narrow angle camera 111. The distance measuring light is laser light for distance measurement. The vertically rotating unit 104 contains a part of an optical system 110 for the distance measuring light and for the narrow angle camera 111. The optical system 110 is shown in FIG. 3. The horizontally rotating unit 101 has a wide angle camera 106 that is mounted thereon.

The angle of view of the narrow angle camera 111 is approximately 9 to 12 degrees in each of a horizontal angle and a vertical angle, whereas the angle of view of the wide angle camera 106 is approximately 170 degrees in each of the horizontal angle and the vertical angle. The vertical angle includes upper and lower angles. Positional relationships and attitude relationships, that is, relationships of exterior orientation parameters, between the narrow angle camera 111, the wide angle camera 106, and the laser scanner 100, are preliminarily obtained and are known.

While the horizontally rotating unit 101 is made to horizontally rotate, and the vertically rotating unit 104 is made to vertically rotate, pulse irradiation of scanning laser light, which is laser light for distance measurement, is performed at a frequency of several tens to several hundreds of kHz. Thus, laser scanning is performed, and point cloud data is obtained.

The horizontally rotating unit 101 also has an operation interface unit 114 that is mounted thereon. The operation interface unit 114 is used for displaying various pieces of information and for controlling. In this embodiment, the operation interface unit 114 is embodied by a touch panel display and is shown in FIG. 3.

FIG. 3 shows a functional block diagram of the laser scanner 100. The laser scanner 100 includes the optical system 110. The objective lens 105 is a component of the optical system 110. The optical system 110 also includes components such as lenses, and mirrors for separating and combining light paths, in addition to the objective lens 105. The optical system 110 separates a light path of the narrow angle camera 111 and a light path of the distance measuring light and also separates a light emitting optical system and a light receiving optical system of the distance measuring light.

The distance measuring light is emitted from a distance-measuring-light emitting unit 112 to the outside via the optical system 110 and the objective lens 105. The distance measuring light is reflected back from an object from which point cloud data is to be obtained, and the reflected distance measuring light enters the objective lens 105 and is received by a distance-measuring-light receiving unit 113 via the optical system 110.

A reference light path (not shown) is provided inside the horizontally rotating unit 101. The pulsed light from the distance-measuring-light emitting unit 112 is branched, and one of the branched pulsed light is emitted to the object as distance measuring light, whereas the other is led to the reference light path as reference light. The distance measuring light that is captured by the objective lens 105 and the reference light that propagates the reference light path are combined by the optical system 110 and are detected by the distance-measuring-light receiving unit 113. At this time, the distance measuring light and the reference light have a light path difference, and thus, output waveforms from the distance-measuring-light receiving unit 113 have a phase difference. On the basis of the phase difference, a distance to a reflection point that reflects the distance measuring light is calculated. This calculation is performed by a distance measuring unit 120.

The value of the distance to the reflection point, which is calculated by the distance measuring unit 120, and a horizontal angle of the horizontally rotating unit 101 and a vertical angle, which is an upper or lower angle, of the vertically rotating unit 104 at the time of measuring the distance, are used to calculate a three-dimensional position of the reflection point that reflects the distance measuring light. The three-dimensional position has the optical origin or the instrument point of the laser scanner 100 as the origin. The coordinates of the reflection point serve as coordinates of a point composing point cloud data. This process is performed by a three-dimensional position calculator 121. The reflection point is a scanned point, and a set of coordinate values of scanned points composes point cloud data. The point cloud data is obtained by a point cloud data obtaining unit 122.

A rotation controlling unit 119 controls horizontal rotation of the horizontally rotating unit 101 and vertical rotation of the vertically rotating unit 104. The horizontally rotating unit 101 is rotated by a horizontal rotation driving unit 115 that includes components such as a motor, a driving circuit for the motor, and a gear. The vertically rotating unit 104 is rotated by a vertical rotation driving unit 116 that includes components such as a motor, a driving circuit for the motor, and a gear.

The horizontal angle of the horizontally rotating unit 101 is measured by a horizontal-rotation-angle measuring unit 117 that includes an angle measuring sensor, such as a rotary encoder, and a peripheral circuit of the angle measuring sensor. The vertical angle of the vertically rotating unit 104 is measured by a vertical-rotation-angle measuring unit 118 that includes an angle measuring sensor, such as a rotary encoder, and a peripheral circuit of the angle measuring sensor.

The operation interface unit 114, which is embodied by a touch panel display, receives an operation content for the laser scanner 100 and displays various pieces of information on a display. A communication unit 123 communicates with a survey data processing device 300 and other apparatuses. The survey data processing device 300 is described later. In this embodiment, the point cloud data is transmitted via the communication unit 123 from the laser scanner 100 to the survey data processing device 300, which is shown in FIG. 4.

Survey Data Processing Device

Figure 4:
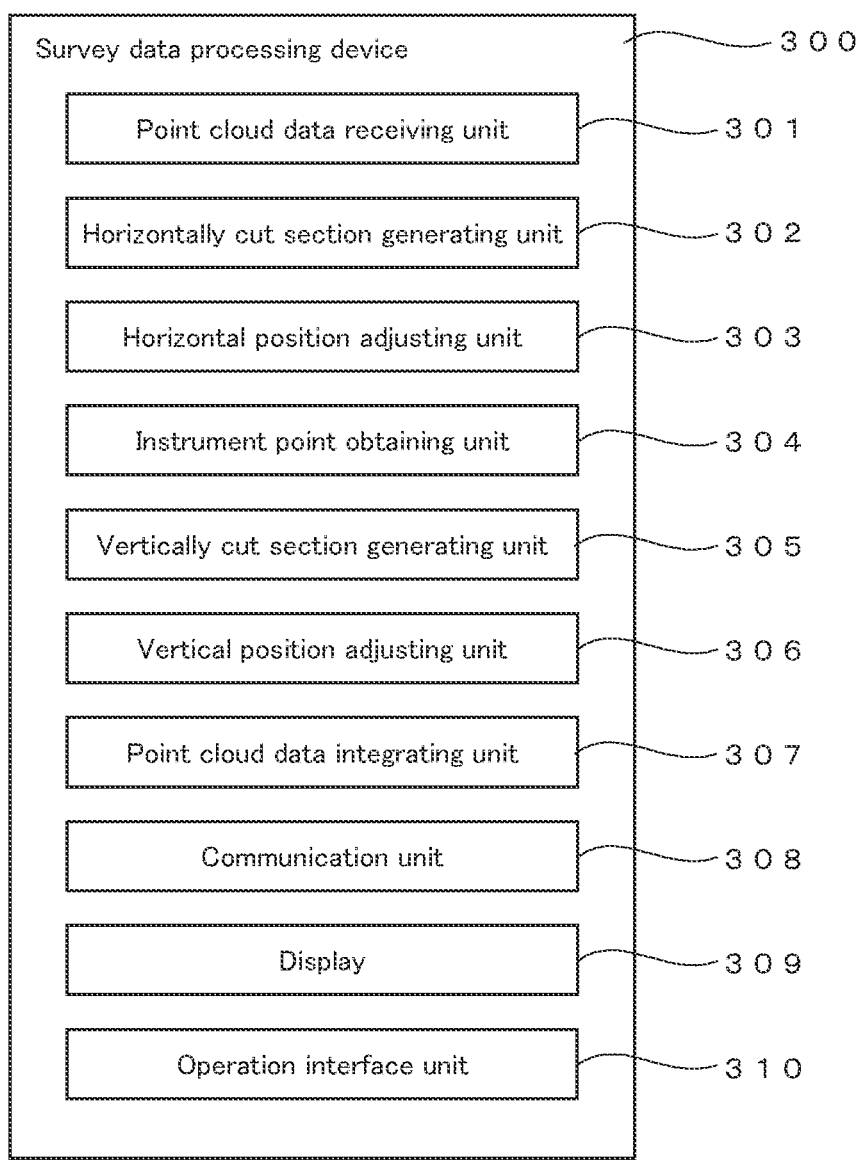
FIG. 4 is a block diagram of a survey data processing device.

FIG. 4 shows the survey data processing device 300 that includes a point cloud data receiving unit 301, a vertically cut section generating unit 305, and a vertical position adjusting unit 306. The point cloud data receiving unit 301 receives first point cloud data and second point cloud data. The first point cloud data is obtained by a first laser scanner that is placed so as to be horizontal at a first instrument point. The second point cloud data is obtained by a second laser scanner that is placed so as to be horizontal at a second instrument point. The vertically cut section generating unit 305 cuts the first point cloud data and the second point cloud data at a vertical plane containing the first instrument point and the second instrument point to obtain a vertically cut section of each of the first point cloud data and the second point cloud data. The vertical position adjusting unit 306 matches vertical positions of the vertically cut sections of the first point cloud data and the second point cloud data as viewed from a direction perpendicular to the vertical plane.

The survey data processing device 300 is a computer that exhibits functions of functional units shown in the drawing. The survey data processing device 300 has a CPU, a memory, an interface, and other integrated circuits, for implementing the functions of the functional units shown in the drawing. The survey data processing device 300 may be embodied by using a general-purpose computer or a piece of dedicated hardware. For example, programs for implementing the functions of the functional units shown in FIG. 4 may be installed in a computer such as a tablet, a smartphone, or a laptop computer, and this computer may be used as the survey data processing device 300. In another example, the survey data processing device 300 may be incorporated inside the laser scanner 100.

The survey data processing device 300 includes the point cloud data receiving unit 301, a horizontally cut section generating unit 302, a horizontal position adjusting unit 303, an instrument point obtaining unit 304, the vertically cut section generating unit 305, the vertical position adjusting unit 306, a point cloud data integrating unit 307, a communication unit 308, a display 309, and an operation interface unit 310.

The point cloud data receiving unit 301 receives the first point cloud data that is obtained at the first instrument point by the laser scanner 100 and also receives the second point cloud data that is obtained at the second instrument point by the laser scanner 100'.

The horizontally cut section generating unit 302 cuts the first point cloud data and the second point cloud data at a horizontal plane to generate a horizontally cut section of each of the first point cloud data and the second point cloud data. The horizontally cut section of the first point cloud data and the horizontally cut section of the second point cloud data may be respectively referred to as "first horizontally cut section" and "second horizontally cut section". The height of the horizontal plane may be selected from any position.

The horizontally cut section is made to have some degree of thickness in a direction perpendicular to the horizontally cut section, in consideration of variation in distribution of points in the point cloud. This thickness is appropriately adjusted. This thickness is set to be greater than an interval of points of point cloud data. Providing some degree of thickness to the cut section also applies to the case of the vertically cut section, which is described later.

The first horizontally cut section and the second horizontally cut section are obtained as follows. Laser scanning data at a vertical angle, which is an upper or lower angle, of 0 degrees, that is, in a horizontal direction, is extracted from the first point cloud data. The extracted point cloud composes the first horizontally cut section. In a case in which no point exists on a line in the vertical angle of 0 degrees, points existing at an angle closest to the vertical angle of 0 degrees are extracted. The second horizontally cut section is obtained in a similar manner. The horizontally cut section can also be obtained by extracting point cloud data at a specific vertical angle, such as at an elevation angle of 15 degrees, instead of the vertical angle of 0 degrees.

The point cloud data may also be horizontally cut by the following method. First, a plane equation of a cut section, that is, a horizontal plane equation, is obtained. Point cloud data that is contained in a plane represented by the plane equation and point cloud data in the proximity to this plane are acquired. Specifically, a shortest distance between this plane and each point of a point cloud is calculated, and points of the point cloud of which the shortest distance is a threshold value or less, are extracted. This method also applies to the case of cutting the point cloud data at a vertical plane.

The horizontal position adjusting unit 303 adjusts horizontal positions of the first horizontally cut section and the second horizontally cut section so that the first horizontally cut section and the second horizontally cut section will coincide with each other as viewed from the vertical direction. The adjustment is performed by rotating and parallelly moving one or both of the horizontally cut sections. The adjustment is performed by automatic operation, manual operation, or semiautomatic operation.

The automatic operation is performed by using a publicly known automatic matching method such as template matching. In this case, one or both of a point cloud in which points are distributed on the first horizontally cut section and a point cloud in which points are distributed on the second horizontally cut section, are rotated and parallelly moved in the horizontal plane so that these point clouds will coincide with each other or be as close as possible to each other, as viewed from the vertical direction.

The manual operation is performed by displaying two horizontally cut sections viewed from the vertical direction, on the display 309, and by manually adjusting the horizontal positions of the two horizontally cut sections while looking at the displayed two horizontally cut sections. In the case of the semiautomatic operation, the manual operation is performed for fine adjustment after the automatic operation is performed, or the automatic operation is performed for fine adjustment after the manual operation is performed for rough adjustment.

The matching of the first horizontally cut section and the second horizontally cut section as viewed downwardly from the vertical direction enables matching of the positions of the first point cloud data and the second point cloud data as viewed downwardly from the vertical direction.

The instrument point obtaining unit 304 obtains positions of the first instrument point and the second instrument point as viewed downwardly from the vertical direction by using the result of matching of the first horizontally cut section and the second horizontally cut section. In more detail, positional relationships between the first point cloud data, the second point cloud data, the first instrument point, and the second instrument point, as viewed downwardly from the vertical direction, are obtained by using the result of matching of the first horizontally cut section and the second horizontally cut section. The information of the positions of the instrument points may also be obtained by actually measuring the positions using a measurement apparatus or by using positioning points that are preliminarily set on a floor.

The vertically cut section generating unit 305 cuts the first point cloud data and the second point cloud data at a vertical plane passing or containing the first instrument point and the second instrument point. The cutting of the first point cloud data at the vertical plane generates a first vertically cut section. The cutting of the second point cloud data at the vertical plane generates a second vertically cut section.

The vertical position adjusting unit 306 adjusts vertical positions, which are positions in the vertical direction, of the first vertically cut section and the second vertically cut section. Specifically, one or both of the vertical positions of the first vertically cut section and the second vertically cut section are moved so that the first vertically cut section and the second vertically cut section will coincide with each other as viewed from a direction perpendicular to the vertical plane, which is used for the cutting. The adjustment of the vertical positions of the vertically cut sections is performed by automatic operation, manual operation, or semiautomatic operation. This is the same as the case of matching the positions of the horizontally cut sections.

The point cloud data integrating unit 307 integrates the first point cloud data that is obtained at the first instrument point and the second point cloud data that is obtained at the second instrument point. The integration of the two point cloud data enables describing the two point cloud data by one coordinate system.

The communication unit 308 communicates with other apparatuses. This communication is performed by using an existing format, such as a wireless connection, a wired line, or an optical line. The optical line may be used for infrared communication, for example. The communication between the laser scanners 100 and 100' is performed via the communication unit 308. The display 309 is a display of the PC serving as the survey data processing device 300 or of another apparatus, such as a liquid crystal display.

The operation interface unit 310 receives various kinds of operations that are input by an operator. For example, various kinds of operations are performed through a GUI by using the display 309 and the operation interface unit 310. In one example, the display 309 and the operation interface unit 310 may be embodied by a touch panel display. In another example, a tablet, a smartphone, or a combination of a tablet and a PC, may be made to function as a terminal having the display 309 and the operation interface unit 310, and various kinds of operations relating to the survey data processing device 300 may be implemented by controlling this terminal.

Example of Processing

The following describes an example of processing relating to the survey data processing device 300. In this example, the survey data processing device 300 is embodied by a laptop computer. The display 309 and the operation interface unit 310 are embodied by a terminal that uses a tablet, a smartphone, a combination of a PC and a tablet, or another apparatus. An operator performs various kinds of operations by using the terminal as a control terminal.

Figure 6:
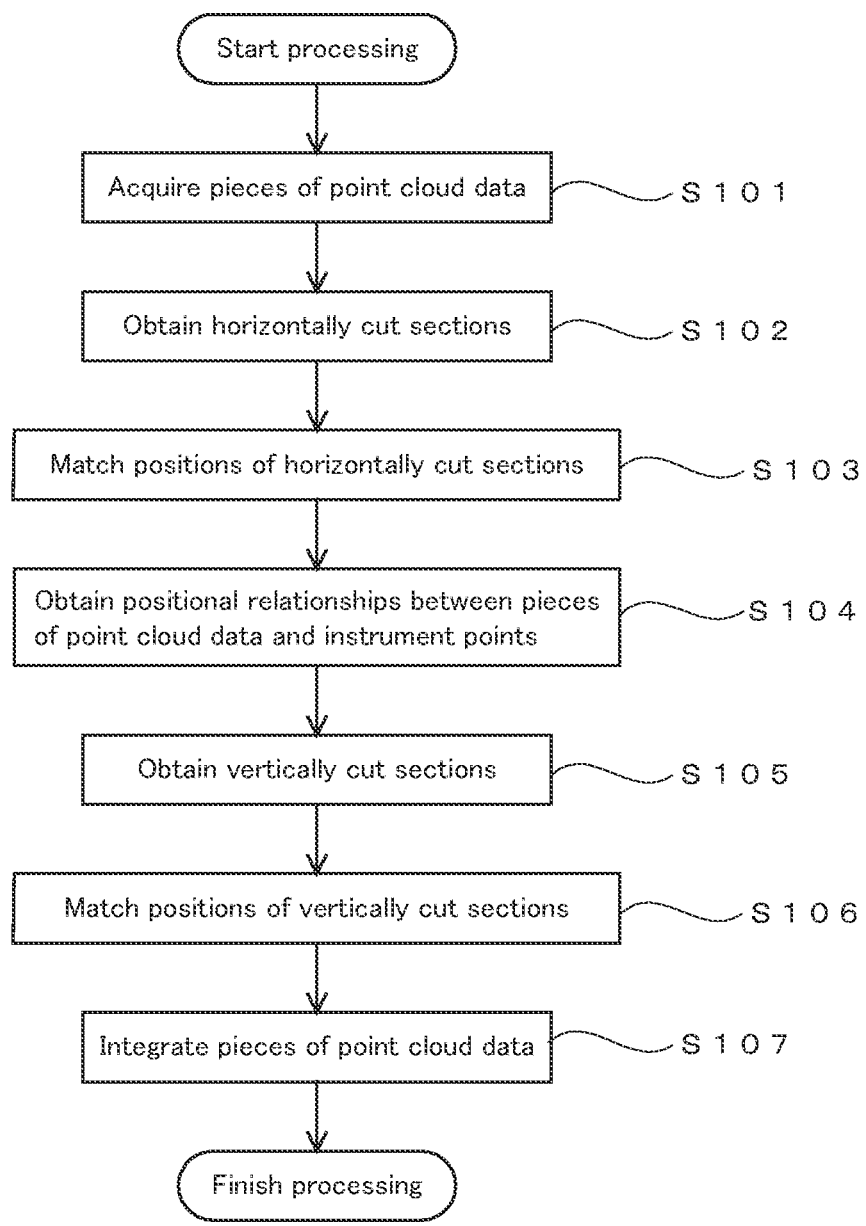
FIG. 6 is a flowchart showing an example of a processing procedure.

FIG. 6 shows an example of a processing procedure. Programs for executing the processing are stored in an appropriate storage area or a storage medium and are executed by the survey data processing device 300.

First, the survey data processing device 300 acquires first point cloud data and second point cloud data (step S101). The first point cloud data is obtained by performing laser scanning using the laser scanner 100 that is placed at a first instrument point in a room in which measurement is to be performed. This situation is shown in FIG. 1. The second point cloud data is obtained by performing laser scanning using the laser scanner 100' that is placed at a second instrument point in the room in which the measurement is to be performed. This situation is also shown in FIG. 1.

The laser scanners 100 and 100' are placed so as to be horizontal at the respective instrument points, and exterior orientation parameters thereof are not known.

After the first point cloud data and the second point cloud data are acquired, a first horizontally cut section and a second horizontally cut section are obtained (step S102). This process is performed by cutting the first point cloud data at a horizontal plane at a position 1 meter above a floor surface to obtain the first horizontally cut section and by cutting the second point cloud data at this horizontal plane to obtain the second horizontally cut section. This process is performed by the horizontally cut section generating unit 302.

The positions of the point cloud data composing the first horizontally cut section and the point cloud data composing the second horizontally cut section are matched (step S103). This process is performed by rotating and parallelly moving one or both of the point cloud data composing the first horizontally cut section and the point cloud data composing the second horizontally cut section to match positions, as viewed downwardly from the vertical direction, of a figure that is formed of distributed points of the point cloud data composing the first horizontally cut section as viewed downwardly from the vertical direction and a figure that is formed of distributed points of the point cloud data composing the second horizontally cut section. This process is performed by the horizontal position adjusting unit 303.

Figure 5B:
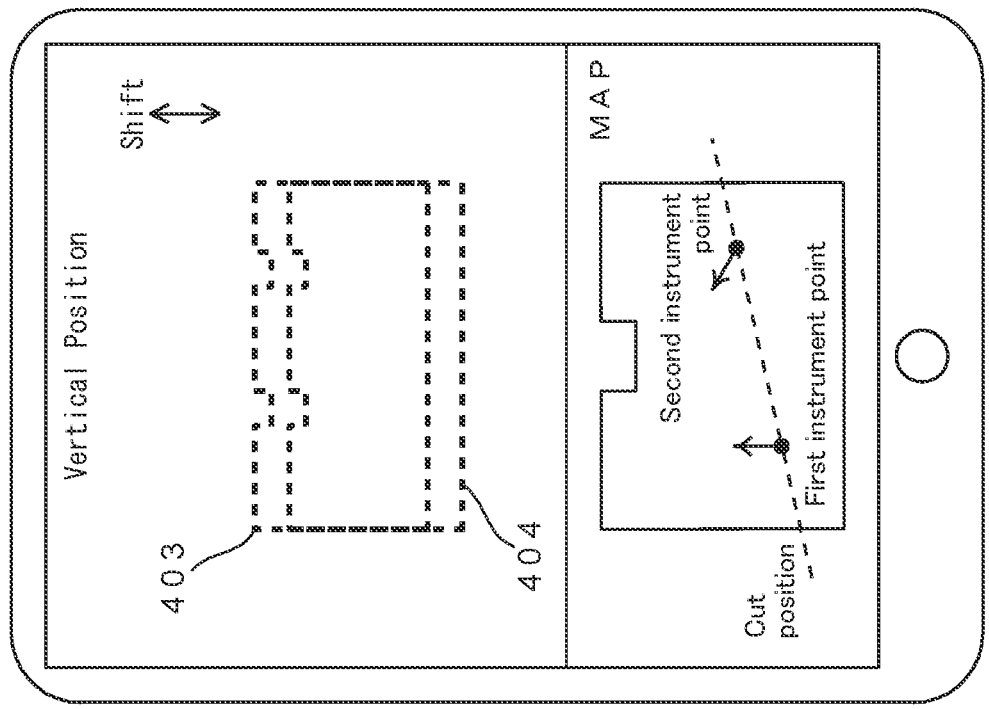
FIGS. 5A and 5B are images showing examples of displayed images on a terminal.
Figure 5A:
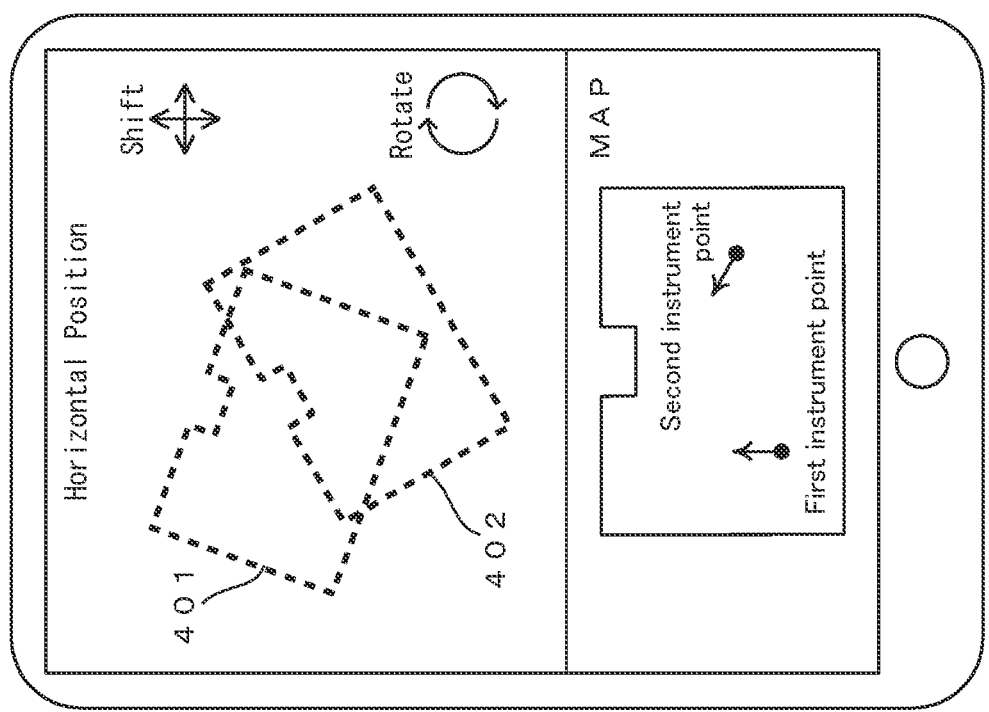

FIGS. 5A and 5B show examples of images that are displayed on a control terminal by a GUI. FIG. 5A shows a first horizontally cut section 401 and a second horizontally cut section 402 as viewed downwardly from the vertical direction. In this example, the first horizontally cut section 401 is composed of a piece of the first point cloud data that is cut at the horizontal plane. Similarly, the second horizontally cut section 402 is composed of a piece of the second point cloud data that is cut at the horizontal plane.

FIG. 5A shows a MAP at a lower part. The MAP approximately shows relationships of position and direction between the first instrument point and the second instrument point. At this stage, exterior orientation parameters of the laser scanner 100 at the first instrument point and exterior orientation parameters of the laser scanner 100' at the second instrument point are not known. Thus, the directions and the positions of the first horizontally cut section 401 and second horizontally cut section 402 do not coincide with each other as shown in FIG. 5A. The MAP approximately shows the positional relationship and is not precise.

In this condition, one or both of the first horizontally cut section 401 and the second horizontally cut section 402 are rotated and are parallelly moved, to make them coincide with each other as viewed downwardly from the vertical direction. FIG. 5A shows a situation in which the rotation and the parallel movement of the horizontally cut section are performed by semiautomatic operation. In this case, the first horizontally cut section 401 or the second horizontally cut section 402 is parallelly moved on the display by manual operation using a "Shift" icon on the display. In addition, the first horizontally cut section 401 or the second horizontally cut section 402 is rotated on the display by manual operation using a "Rotate" icon on the display. Thus, the first horizontally cut section 401 and the second horizontally cut section 402 are made to be as close as possible to each other as viewed from the vertical direction. This operation is performed by using a function of a publicly known GUI.

In another example, the horizontal positions may be matched by selecting two common points from each of the horizontally cut sections. Alternatively, a method for matching positions of two pieces of point cloud data, which is disclosed in Japanese Patent Application No. 2018-178656, can also be used.

At the stage that the first horizontally cut section 401 and the second horizontally cut section 402 approximately coincide with each other as viewed from the vertical direction, an automatic pulling-in function is performed to automatically rotate and parallelly move one or both of the first horizontally cut section 401 and the second horizontally cut section 402. As a result, the first horizontally cut section 401 and the second horizontally cut section 402 are adjusted so as to coincide with each other. For example, the first horizontally cut section 401 is rotated and is parallelly moved so that the point cloud composing the first horizontally cut section 401 and the point cloud composing the second horizontally cut section 402 will have the smallest difference. Making the first horizontally cut section 401 and the second horizontally cut section 402 coincide with each other as viewed from the vertical direction enables making the first point cloud data and the second point cloud data coincide with each other as viewed from the vertical direction, although some margins of error are contained.

After the positions of the horizontally cut sections are matched, positional relationships between the point cloud data of the first horizontally cut section, the first instrument point, the point cloud data of the second horizontally cut section, and the second instrument point, as viewed downwardly from the vertical direction, are obtained (step S104). This process is performed by the instrument point obtaining unit 304. This process determines a positional relationship between the two instrument points as viewed downwardly from the vertical direction.

At this stage, the positional relationship between the point cloud data of the first horizontally cut section and the first instrument point is known. The positional relationship between the point cloud data of the second horizontally cut section and the second instrument point is also known. Moreover, the point cloud data of the first horizontally cut section and the point cloud data of the second horizontally cut section are made to coincide with each other as viewed downwardly from the vertical direction by the process in step S103. Thus, the positional relationships between the point cloud data of the first horizontally cut section, the first instrument point, the point cloud data of the second horizontally cut section, and the second instrument point, as viewed downwardly from the vertical direction, are determined. In other words, the positional relationships between the first point cloud data, the first instrument point, the second point cloud data, and the second instrument point, as viewed downwardly from the vertical direction, are determined.

Next, the first point cloud data is cut by using a vertical plane passing the first instrument point and the second instrument point, to obtain a first vertically cut section. Also, the second point cloud data is cut by using the vertical plane to obtain a second vertically cut section (step S105). FIG. 5B shows a first vertically cut section 403 and a second vertically cut section 404 as viewed from a horizontal direction that is perpendicular to the vertical plane used for the cutting. At this stage, since the positions of the first point cloud data and the second point cloud data as viewed from the vertical direction are already matched in step S103, the positions thereof as viewed from the vertical direction approximately coincide with each other, and positions of the first vertically cut section 403 and the second vertically cut section 404 in the horizontal direction approximately coincide with each other. However, since the positions of the first vertically cut section 403 and the second vertically cut section 404 in the vertical direction are still not matched, the first vertically cut section 403 and the second vertically cut section 404 are displaced from each other in the vertical direction.

In view of this, the position in the vertical direction of one or each of the first vertically cut section 403 and the second vertically cut section 404 is adjusted to match the positions of the first vertically cut section 403 and the second vertically cut section 404 in the vertical direction (step S106). This process is performed by the vertical position adjusting unit 306.

FIG. 5B shows a situation in which upward and downward movement of the vertically cut section is performed by the semiautomatic operation. In this case, the first vertically cut section 403 or the second vertically cut section 404 is moved upwardly or downwardly on the display by using a "Shift" icon on the display to make the first vertically cut section 403 and the second vertically cut section 404 as close as possible to each other.

In the stage in which the two vertically cut sections approximately coincide with each other, an automatic pulling-in function is performed to automatically adjust one or both of the first vertically cut section 403 and the second vertically cut section 404 to make them coincide with each other. For example, the position of the first vertically cut section 403 is searched for in the upper and lower directions so that the point cloud composing the first vertically cut section 403 and the point cloud composing the second vertically cut section 404 will have the smallest difference. When the difference between the point cloud composing the first vertically cut section 403 and the point cloud composing the second vertically cut section 404 is smallest, the positions of the first vertically cut section 403 and the second vertically cut section 404 match. Thus, the first point cloud data and the second point cloud data are matched in the vertical direction.

In the above processes, the positions of the first point cloud data and the second point cloud data are matched in the horizontal direction (step S103) and are matched in the vertical direction (step S106), whereby three dimensional positions thereof are matched. In terms of an XYZ coordinate system having a Z-axis as a vertical axis, the positions of the first point cloud data and the second point cloud data are matched in an X-Y direction in step S103 and are matched in a Z-direction in step S106. That is, the position matching in the X-Y direction and the position matching in the Z-direction result in position matching in the XYZ coordinate system.

Thereafter, the first point cloud data and the second point cloud data are integrated (step S107). This process is performed by the point cloud data integrating unit 307. This process enables describing the first point cloud data and the second point cloud data by the same coordinate system.

Brief Overall Explanation

One or both of the first point cloud data and the second point cloud data, which are obtained from different instrument points, are rotated and parallelly moved to match them in the horizontal direction (step S103). Moreover, positions of the two instrument points in the horizontal plane are obtained (step S104). Then, the first point cloud data and the second point cloud data are cut at a vertical plane passing the two instrument points to obtain a first vertically cut section and a second vertically cut section (step S105). The first vertically cut section and the second vertically cut section are compared with each other, and the first point cloud data and the second point cloud data are matched in the vertical direction (step S106).

The matching of the positions in the horizontal direction and in the vertical direction results in three-dimensional matching of the first point cloud data and the second point cloud data.

The matching method that is described in this embodiment is approximate matching, but this method provides an accuracy sufficient for checking a matching state of the obtained pieces of point cloud data. The matching method that is described in this embodiment can also be used for setting an initial condition before detail matching such as template matching is performed. Detail matching may be performed after the approximate matching is performed. This allows reduction in matching failures and reduction in processing time.

Supplementary Explanation

Pieces of point cloud data in a horizontally cut section and in a vertically cut section are acquired by using a mobile device of a terminal or by using a scanner. In a case of transmitting the entirety of scanned point cloud data to the mobile device, the mobile device calculates a cut section and acquires point cloud data of the cut section from the entirety of the scanned point cloud data. In this case, the transmission of the data requires time.

In a case of acquiring pieces of point cloud data in a horizontally cut section and in a vertically cut section by the scanner, the scanner calculates a cut section, and only point cloud data of the cut section necessary for position adjustment, which is the result of the calculation, is transmitted from the scanner to the mobile device. In this case, the amount of data to be transmitted is small, and time for transmitting the data is reduced.

In a case of acquiring point cloud data in a horizontally cut section, the point cloud data may be added with an index each time when the point cloud data is rotated once in the vertical direction. Thus, for example, a horizontally cut section at a height of an instrument point is extracted by extracting a point cloud with an index corresponding to a vertical angle of 0 degrees.

As for the vertically cut section, a horizontal angle for cutting a vertically cut section may be obtained at each position of the scanner at the time when the horizontal positional relationship is determined in the first adjustment step. This data may be held by the mobile device, and a necessary vertically cut section may be obtained by directing a horizontal angle by means of a command from the mobile device to the scanner.

The present invention can be used in a technique for matching pieces of point cloud data that are obtained from different instrument points.

What is claimed is:

1. A survey data processing device comprising:
a point cloud data receiving unit that receives first point cloud data and second point cloud data, the first point cloud data being obtained by a first laser scanner that is placed so as to be horizontal at a first instrument point, the second point cloud data being obtained by the first laser scanner or a second laser scanner that is placed so as to be horizontal at a second instrument point, the second laser scanner being different from the first laser scanner, the second instrument point being different from the first instrument point;
a horizontally cutting unit that cuts the first point cloud data and the second point cloud data at a horizontal plane to obtain a horizontally cut section of each of the first point cloud data and the second point cloud data;
a horizontal position matching unit that matches horizontal positions of the horizontally cut sections of the first point cloud data and the second point cloud data as viewed from a vertical direction;
an instrument point position obtaining unit that obtains positions of the first instrument point and the second instrument point of the first point cloud data and the second point cloud data as viewed downwardly from the vertical direction, on a basis of the first point cloud data and the second point cloud data of which the horizontal positions are matched by the horizontal position matching unit;
a vertically cutting unit that cuts the first point cloud data and the second point cloud data at a vertical plane containing the first instrument point and the second instrument point to obtain a vertically cut section of each of the first point cloud data and the second point cloud data; and
a vertical position matching unit that matches vertical positions of the vertically cut sections of the first point cloud data and the second point cloud data as viewed from a direction perpendicular to the vertical plane.

2. A survey data processing method comprising:
receiving first point cloud data and second point cloud data, the first point cloud data being obtained by a first laser scanner that is placed so as to be horizontal at a first instrument point, the second point cloud data being obtained by the first laser scanner or a second laser scanner that is placed so as to be horizontal at a second instrument point, the second laser scanner being different from the first laser scanner, the second instrument point being different from the first instrument point;
cutting the first point cloud data and the second point cloud data at a horizontal plane to obtain a horizontally cut section of each of the first point cloud data and the second point cloud data;
matching horizontal positions of the horizontally cut sections of the first point cloud data and the second point cloud data as viewed from a vertical direction;
obtaining positions of the first instrument point and the second instrument point of the first point cloud data and the second point cloud data as viewed downwardly from the vertical direction, on a basis of the first point cloud data and the second point cloud data in which the horizontal positions are matched;

cutting the first point cloud data and the second point cloud data at a vertical plane containing the first instrument point and the second instrument point to obtain a vertically cut section of each of the first point cloud data and the second point cloud data; and matching vertical positions of the vertically cut sections of the first point cloud data and the second point cloud data as viewed from a direction perpendicular to the vertical plane.

3. A non-transitory computer recording medium storing computer executable instructions that, when executed by a computer processor, cause the computer processor to perform operations comprising:

receiving first point cloud data and second point cloud data, the first point cloud data being obtained by a first laser scanner that is placed so as to be horizontal at a first instrument point, the second point cloud data being obtained by the first laser scanner or a second laser scanner that is placed so as to be horizontal at a second instrument point, the second laser scanner being different from the first laser scanner, the second instrument point being different from the first instrument point;

cutting the first point cloud data and the second point cloud data at a horizontal plane to obtain a horizontally cut section of each of the first point cloud data and the second point cloud data;

matching horizontal positions of the horizontally cut sections of the first point cloud data and the second point cloud data as viewed from a vertical direction;

obtaining positions of the first instrument point and the second instrument point of the first point cloud data and the second point cloud data as viewed downwardly from the vertical direction, on a basis of the first point cloud data and the second point cloud data in which the horizontal positions are matched;

cutting the first point cloud data and the second point cloud data at a vertical plane containing the first instrument point and the second instrument point to obtain a vertically cut section of each of the first point cloud data and the second point cloud data; and matching vertical positions of the vertically cut sections of the first point cloud data and the second point cloud data as viewed from a direction perpendicular to the vertical plane.

* * * * *